United States Patent [19]

Lovell et al.

[11] 4,380,343

[45] Apr. 19, 1983

[54] FOLDING SCISSOR FRAME WHEEL CHAIR

[76] Inventors: Walter Lovell, 348 Mountain Rd.; Richard Lawrence, 39 Manchonis Rd., both of Wilbraham, Mass. 01608

[21] Appl. No.: 898,902

[22] Filed: Apr. 24, 1978

[51] Int. Cl.³ ........ B62M 1/14

[52] U.S. Cl. ........ 280/242 WC; 280/250; 297/DIG. 4

[58] Field of Search ........ 280/242 WC, 242 R, 250, 280/249, 289 G, 211, 647, 649, 650; 297/DIG. 4, DIG. 10, 417; 108/119; 74/242.16

[56] References Cited

U.S. PATENT DOCUMENTS

| | | | |
|---|---|---|---|
| 628,820 | 7/1899 | Lamplugh | 74/242.16 |
| 2,427,782 | 9/1947 | Hausman | 280/242 WC |
| 2,592,025 | 4/1952 | Gray | 280/211 X |
| 2,625,208 | 1/1953 | Lee | 108/119 |
| 3,049,364 | 8/1962 | Clay | 280/250 X |
| 3,574,399 | 4/1971 | Udden | 297/417 X |
| 3,758,150 | 9/1973 | Williams | 297/DIG. 4 X |
| 3,937,490 | 2/1976 | Mohamed | 297/DIG. 4 |
| 3,968,991 | 7/1976 | MacLaren | 280/242 WC |

FOREIGN PATENT DOCUMENTS

| | | | |
|---|---|---|---|
| 529233 | 6/1954 | Belgium | 280/242 WC |
| 910876 | 6/1946 | France | 280/649 |

*Primary Examiner*—Joseph F. Peters, Jr.
*Assistant Examiner*—Ross Weaver
*Attorney, Agent, or Firm*—Charles R. Fay

[57] ABSTRACT

A wheel chair having novel features for more comfort and easier operation by the occupant, with reference to the chain drive and tension adjustment therefor, a guard for the chain, a variable tension brake system, swing away foot rests, and swing away (and removable) arm rests, whereby the user can enter from the side of the chair.

8 Claims, 8 Drawing Figures

FOLDING SCISSOR FRAME WHEEL CHAIR

BACKGROUND OF THE INVENTION

While the art of self-propelled wheel chairs is very old going back at least to 1882, see Arbogast U.S. Pat. No. 2,871,789, most wheel chairs have been made not so much with a view towards the ease and comfort of the occupant but rather looking towards providing inexpensive constructions, folding, adjustments, and mode of travel, and it is the purpose of the present invention to provide a confortable, easily operated wheel chair which is much more convenient for the occupant and easier to operate.

DISCUSSION OF THE PRIOR ART

It is believed that the closest of the many patents on wheel chairs resides in U.S. Pat. No. to Gardner et al, 3,442,532, which provides means for holding the frame, foot support adjustments, brakes, and chain drive. Attention is also directed to Arbogast, supra.

SUMMARY OF THE INVENTION

In the present case a wheel chair is provided which is easily foldable with a cushioned back rest folded down on a cushioned seat and a fore and aft scissor frame supporting the seat which is foldable vertically thus avoiding the usual prior art construction of cross-wise scissor frames which cause folding the wheel chair horizontally. These prior art chairs usually have large wheels which are directly engaged by the hands of the operator making it unwieldy to fold.

The present construction uses a chain drive. There are small independent rotatable hand wheels which, by the chain, drive wheels located to the rear of the wheel chair, these wheels being much smaller then normal and allowing for a rearward pivotal axis for the wheel chair whereby an attendant can tilt it back to go up over a curb, etc. This is usually very difficult to do and reference to the Arbogast patent above-cited clearly illustrates this deficiency of the prior art.

Furthermore, the independent wheel drive insures that the operator's hands do not contact the wheel which supports the wheel chair on the ground and, therefore, becomes dirty, again see the Arbogast patent.

The present invention also utilizes forward swivels to support the chair by a four wheel construction.

Arm rests are included which are completely removable and which also swivel allowing the user to enter from the side rather than having to sit down between the arm rests from the front, and for further convenience the foot rests are individually adjustable vertically and can be swung away instead of flipping up as in the prior art.

In addition the chain drive is very easily adjustable for correct tension; it is adequately guarded in a very simple and inexpensive manner; and the back rest is tiltable for the comfort of the operator or user.

PREFERRED EMBODIMENT OF THE INVENTION

Figure 1:
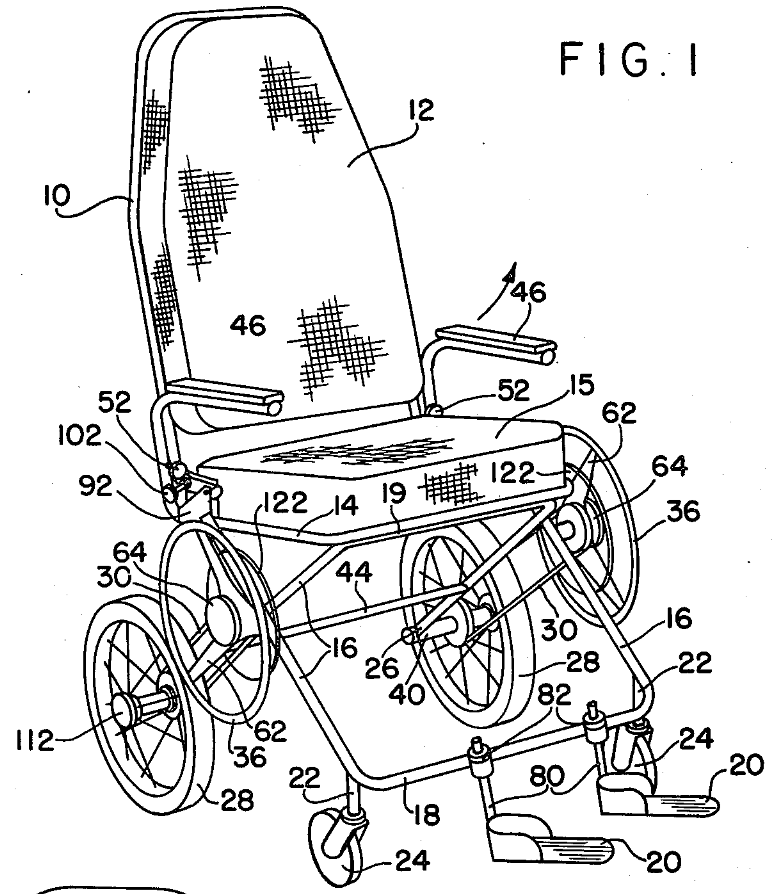
FIG. 1 is a perspective view illustrating the invention.
Figure 3:
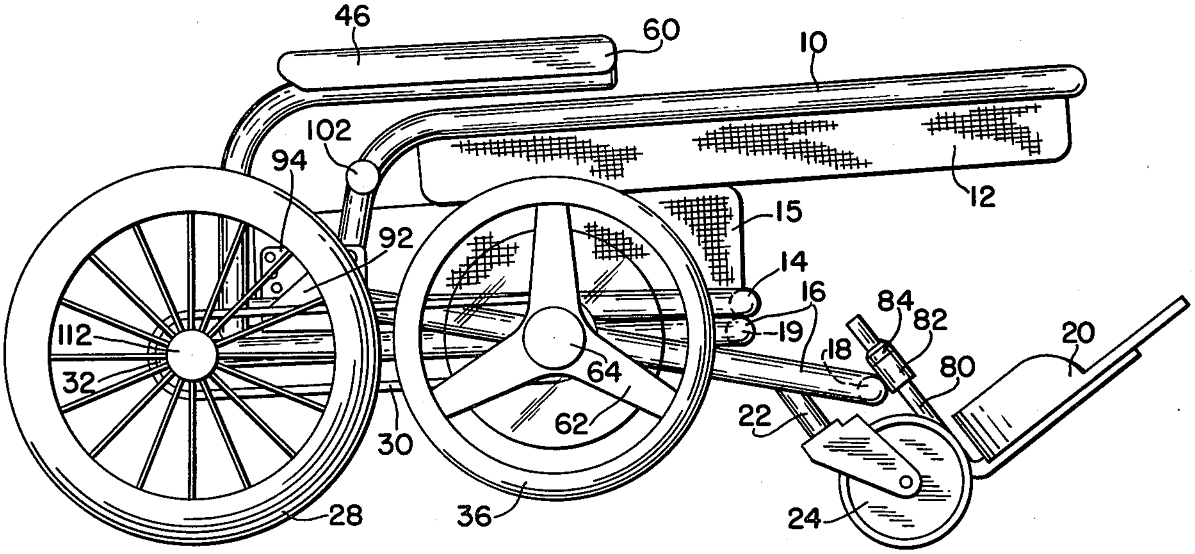
FIG. 3 is a side view showing the wheel chair folded.

Referring now to FIG. 1, reference numeral 10 indicates an inverted U-shaped back rest frame which may be provided with an upholstered pad or the like 12 for the comfort of the user of the wheel chair. The seat frame is indicated generally by the reference numeral 14 and this also has an upholstered pad 15 thereon. The wheel chair is foldable with pads intact as is illustrated in FIG. 3. The seat frame is connected to a pair of fore and aft scissor frames which are generally indicated at 16,16 and these are connected by front cross braces 18,19, brace 18 mounting the foot rests 20,20, the foot rests being alike. The frame 16,18 also provide the supports for angularly disposed tubular members 22 which mount swivel casters or the like 24,24 for support of the wheel chair at the forward part thereof.

Figure 2:
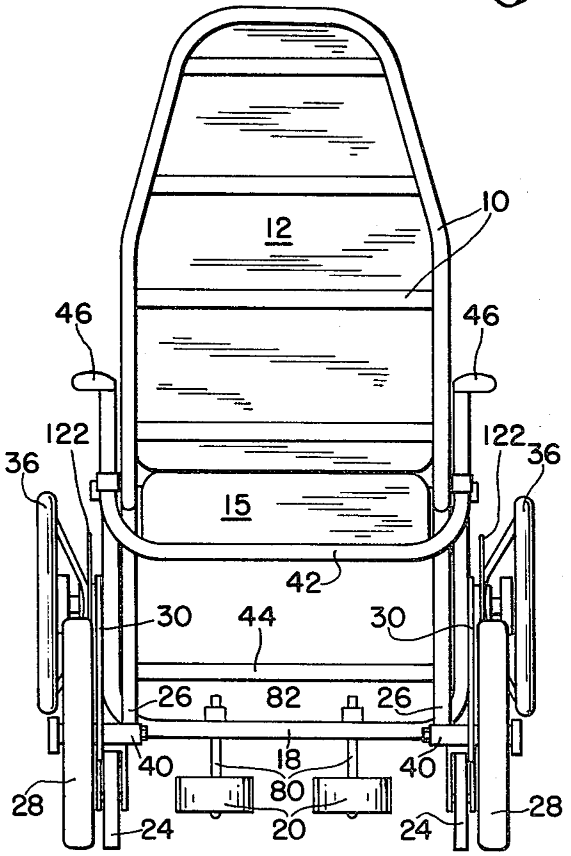
FIG. 2 is a view in rear elevation.
Figure 4:
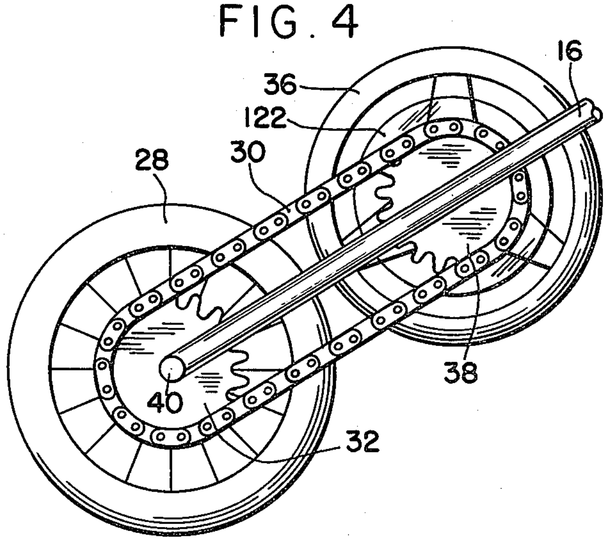
FIG. 4 is an enlarged side view of the chain drive.

At the rear portion of the scissor frames they are provided with extensions 26,26 on which are mounted the driving wheels 28,28 which contact the ground and support the wheel chair at the rear portion thereof. These wheels are actually slightly to the rear of the seat frame and drive the wheel chair through the intermediary of a chain 30, the driving wheels 28 being provided with sprockets 32. The scissor frames are pivoted so as to fold down as shown in FIG. 3, or to be extended as shown in FIGS. 1 and 2, and approximately at the axis of the pivot of the scissor frames hand wheels 36 are provided, these also having sprockets 28 engaged with chain 30 so that by turning wheels 36, the wheel chair may be easily propelled and steered, the wheels 28,28 being on separate studs as clearly shown as for instance at 40,40 in FIG. 2.

Connected across the seat frame is a rear cross member 42 and it is to be noted that the scissor frame has a front strengthening cross piece 44. Mounted at the ends of the cross piece 42 are a pair of arm rests generally indicated at 46,46, these being detachably and swivelly mounted on studs 50, see FIG. 6, and held in position by set screws 52 or the like. The studs 50 are mounted on upturned ends 54 of the rear seat cross piece 42. There are appropriate stops at 58 to position the arm rests 46, which may also be upholstered as at 60, but it will be seen that the arm rests can be swivelled outwardly in the direction of the curved arrow for instance in FIG. 1.

The hand wheels 36 are provided with very easily operable brakes comprising means impinging upon spiders or hubs 62 of each wheel holding these wheels fixed. This is best seen in FIG. 3. A rotary knob 64 mounted on a fixed screw clamps against the center part of the spider, and holds the entire wheel chair immobile, because since wheels 36 cannot turn, the wheels 28 are locked. It should be noted that there is one of these brakes for each hand wheel 36, making the unit doubly safe.

Figure 7:
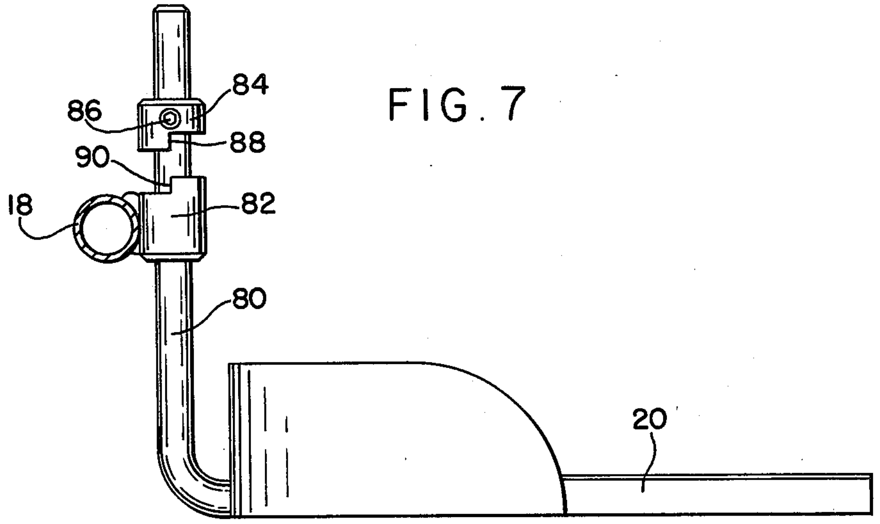
FIG. 7 is a view in side elevation on an enlarged scale illustrating a foot rest.

Referring now to FIG. 7, a foot rest 20 is shown as mounted on a rod 80 slidable vertically in a socket 82, each socket 82 being mounted on the front cross bar 18 of the scissor frame 16. A collar 84 is held in position by a set screw 86 and the collar has a notch 88 in conformance with a notch 90 on the socket 82, so when the foot rest is shifted down from the FIG. 7 position these notches engage and hold the foot rest in a forward position. This can be changed by moving the rods upwardly and swivelling the same to a rearward or to a side position depending upon the convenience of the user.

Figure 6:
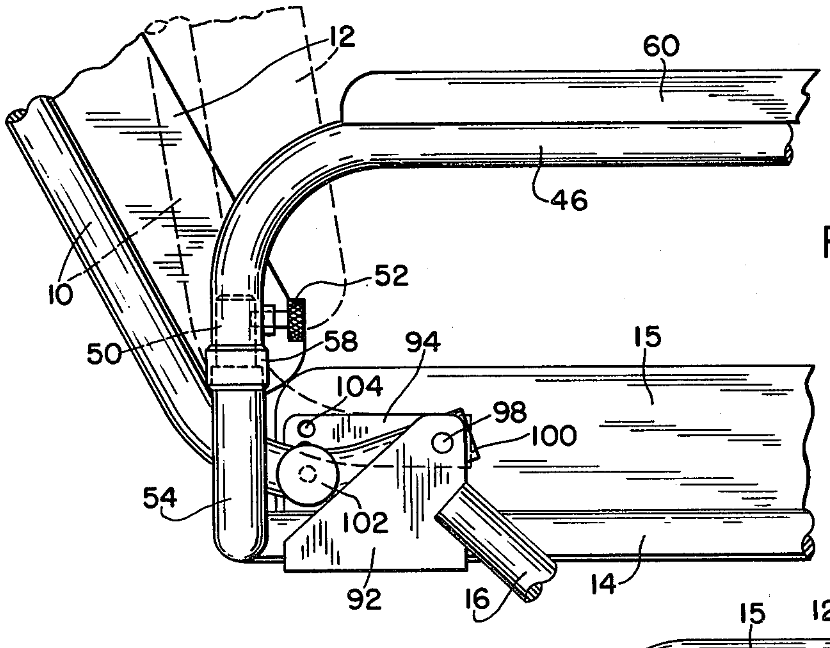
FIG. 6 is a side view on an enlarged scale illustrating the tilting adjustment of the back rest and the removability of the arm rests.

The seat frame 14 is provided at each side thereof with a plate 92, this plate being U-shaped in form and having a parallel upstanding part 94, see FIG. 6, and between them they provide a pivot 98 for the ends 100 of the back rest seat frame 10. The end portions 100 of the back rest seat frame 10 are located at an angle, as clearly shown, and are provided with screw threaded members 102 taking into selected apertures 104 for holding the seat frame in adjusted positions between the dotted line and solid line showings in FIG. 6.

Figure 5:
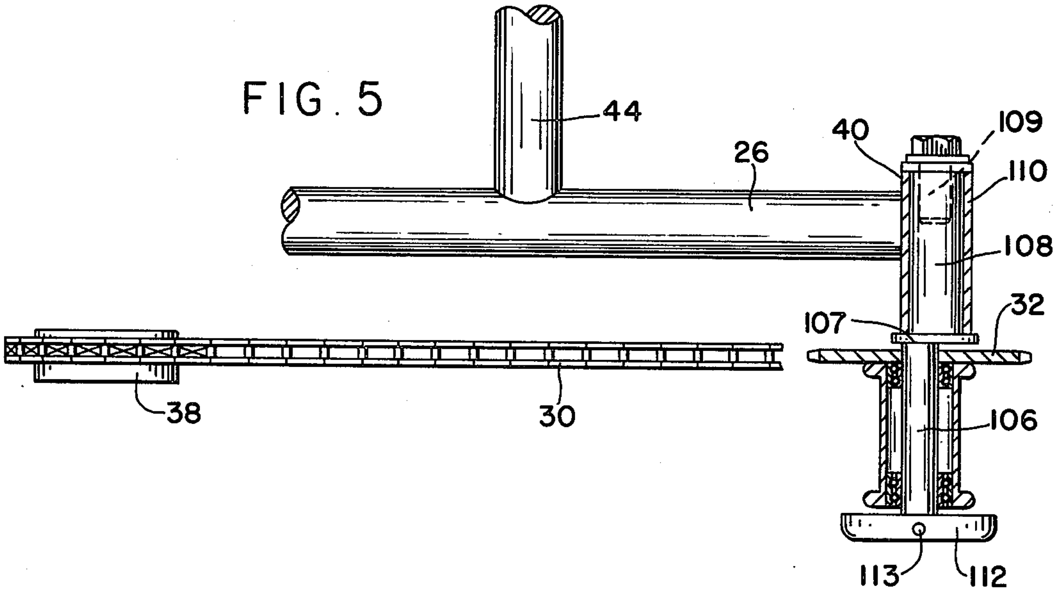
FIG. 5 is a detail view of the chain drive, parts in section, illustrating the adjustment therefor.

To adjust the tension of the chain 30 attention is directed to FIG. 5. The sprocket 32 is mounted on a stud 106 eccentrically mounted with respect to another stud 108 which is in turn mounted in a tube 110 on the frame extension 26. Both studs are fixed to a plate 107. In order to adjust the tension it is merely necessary to adjust the angular relationship between stud 106 and stud 108 by means of handle 112.

This is done by loosening bolt 109 that holds stud 108 fixed, rotate stud 106, to the desired point and retighten bolt 109, as shown in FIG. 5, the tension on chain 30 is at a minimum.

Figure 8:
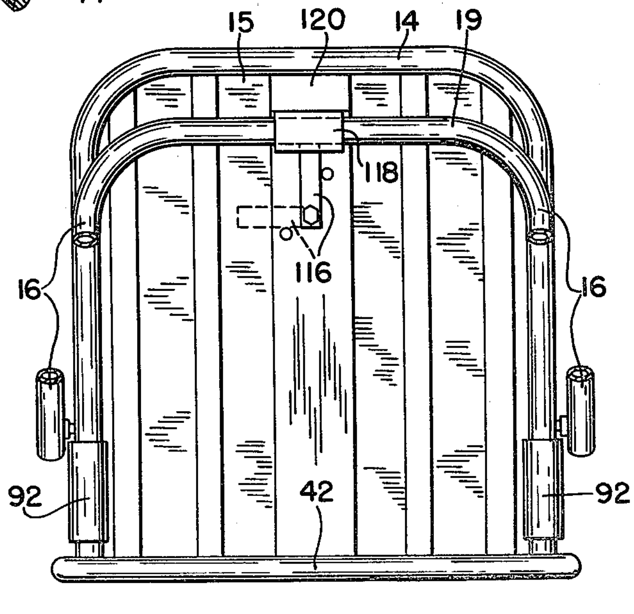
FIG. 8 is a bottom view illustrating the safety lock.

Referring now to FIG. 8, there is shown the bottom of the seat which has a simple pivoted latch 116 shown in dotted line position as free so as to allow the scissor frames to fold and in solid line position it is latched with a ledge 118 to hold the scissor frames extended in the FIG. 1 position, the folded position being shown in FIG. 3. The ledge 118 is on a plate 120 on the forward portion of the seat frame 14 and the forward portion 19 of one of the scissor frames 16 is latched under the ledge 118 and held securely in place by the pivotal element 116 holding the entire wheel chair erect.

Simple clear plastic discs 122 centrally mounted on the axes of wheels 36 completely shield the hands of the user from any accidental damage from the chair.

It is believed that it will be clear that the present construction offers a much more comforable wheel chair which is cleaner and more easily operable then the wheel chairs of the prior art as exemplified in those identified above.

We claim:

1. A wheel chair comprising a pair of generally parallel spaced vertical scissor frames extending fore and aft of the chair, a seat frame, a back rest frame, means for detachably connecting a portion of one of the scissor frames with respect to the seat frame to hold the scissor frames and the chair erect, said means being releasable to allow the scissor frames to fold into general parallelism with and in close association to the seat frame, and means pivotally mounting the back rest frame with respect to the seat frame to allow it to move into parallel relationship therewith, hand wheels rotatably mounted on the scissor frames adjacent the point of pivotal connections of said scissor frames, driving wheels rotatably mounted on one of said scissor frames, a chain connecting the wheels so that the hand wheels drive the driving wheels, the driving wheels being located at the rear of the chair and the hand wheel being intermediate of the ends of the frames and means to adjust the tension of the chain.

2. The wheel chair of claim 1 wherein the axis of the driving wheels is adjacent the rear of the seat frame.

3. The wheel chair of claim 1 wherein the means for tensioning the chain comprises a pair of studs one of which is in relatively fixed position and the other of which is eccentrically mounted with respect thereto.

4. The wheel chair of claim 1 wherein the detachable connection means includes a safety lock mounted on the seat frame at the under side thereof and engagable with a portion of one of said scissor frames holding said wheel chair in extended condition.

5. The wheel chair of claim 1 including a disc mounted with respect to the axis of said hand wheel between the hand wheel and the chain, to protect the hand of the user on the hand wheel from engaging with the chain.

6. The wheel chair of claim 1 including arm rests, and means mounting said arm rest to swivel, said swivel means being located adjacent the back rest frame, so the arm rests are adapted to swivel outwardly.

7. The wheel chair of claim 6 including means for detachably connecting said arm rests with respect to said seat frame.

8. A wheel chair comprising a pair of scissor frames which are interpivoted, said scissor frames extending fore and aft of the chair and each including a forward cross member, a seat frame pivoted with respect to one of said scissor frames, a lock on said seat frame engagable with a portion of the other scissor frame at the forward cross member thereof, hand wheels rotatably mounted at the intersection of said scissor frames at either side of the wheel chair, sprockets on the hand wheels, a guard between each hand wheel and the chain, driving wheels mounted on the scissor frame having the locking engagement with said seat frame, sprockets on the driving wheels, and chains engaged with said sprockets, and means for adjusting the tension of said chain, said last named means including adjustable eccentric devices.

* * * * *